(12) United States Patent
Mishina

(10) Patent No.: US 8,866,420 B2
(45) Date of Patent: Oct. 21, 2014

(54) ELECTRIC POWER CONSUMPTION CONTROL SYSTEM

(75) Inventor: Shunji Mishina, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 222 days.

(21) Appl. No.: 13/504,887

(22) PCT Filed: Jan. 20, 2011

(86) PCT No.: PCT/JP2011/050914
§ 371 (c)(1),
(2), (4) Date: Jun. 18, 2012

(87) PCT Pub. No.: WO2011/093194
PCT Pub. Date: Aug. 4, 2011

(65) Prior Publication Data
US 2012/0261989 A1    Oct. 18, 2012

(30) Foreign Application Priority Data

Jan. 29, 2010   (JP) .................................. 2010-017656

(51) Int. Cl.
*H02P 5/00* (2006.01)
*H02P 5/46* (2006.01)
*H02J 3/14* (2006.01)
*G05B 19/416* (2006.01)

(52) U.S. Cl.
CPC ......... *H02J 3/14* (2013.01); *G05B 2219/34314* (2013.01); *G05B 19/416* (2013.01); *G05B 2219/32021* (2013.01)
USPC ................. 318/255; 318/34; 318/63; 318/64; 318/66; 318/68; 307/35; 307/125; 307/126

(58) Field of Classification Search
CPC ............... G05B 19/37252; G05B 2219/37285; B23Q 15/225; B24B 47/22; B29C 2945/76026; B29C 2945/76033; B29C 45/7666; G01R 21/133
USPC .............. 700/174, 33, 173, 34; 318/561, 571, 318/560, 34, 63, 64, 66, 67, 68; 307/35, 307/125, 126
See application file for complete search history.

(56) References Cited

U.S. PATENT DOCUMENTS 4,279,013 A * 7/1981 Cameron et al. ................. 700/33
4,351,029 A * 9/1982 Maxey et al. .................... 702/34

(Continued)

FOREIGN PATENT DOCUMENTS

| JP | 56-82909 A | 7/1981 |
|---|---|---|
| JP | 61-180530 A | 8/1986 |

(Continued)

*Primary Examiner* — Rita Leykin
(74) *Attorney, Agent, or Firm* — Birch, Stewart, Kolasch & Birch, LLP

(57) ABSTRACT

Disclosed is an electric power consumption control system for a factory where a plurality of machine tools (Mi, Mp1, Mp2) are installed. A machine tool (Mi) is provided with a control device (10) whereby either the rotational acceleration/deceleration (Pi) for the motor for the machine tool and/or the rotational speed (Si) thereof is controlled on the basis of information regarding electric power consumption (Wt) in the factory so that electric power consumption will not exceed a specified value (We). This electric power consumption control system is also provided with electric power detection instruments (11, 12, 13) and an electric power monitoring instrument (20) which measure the electric power consumption of all the machine tools installed in the factory, thereby obtaining the electric power consumption of the factory, and provide information regarding the electric power consumption to the control device of the machine tool equipped with the control device.

8 Claims, 3 Drawing Sheets

(56) References Cited

U.S. PATENT DOCUMENTS

| | | | | |
|---|---|---|---|---|
| 4,509,126 A | * | 4/1985 | Olig et al. | 700/173 |
| 4,547,847 A | * | 10/1985 | Olig et al. | 700/52 |
| 4,663,721 A | * | 5/1987 | Herscovici | 700/160 |
| 8,774,948 B2 | * | 7/2014 | Xu | 700/31 |
| 2007/0293969 A1 | | 12/2007 | Hirai et al. | |
| 2010/0117568 A1 | * | 5/2010 | Iwashita et al. | 318/400.02 |

FOREIGN PATENT DOCUMENTS

| | | |
|---|---|---|
| JP | 64-63745 A | 3/1989 |
| JP | 6-161535 A | 6/1994 |
| JP | 2002-236508 A | 8/2002 |
| JP | 2006-277131 A | 10/2006 |
| JP | 4585613 B1 | 11/2010 |

* cited by examiner

[FIG.1]
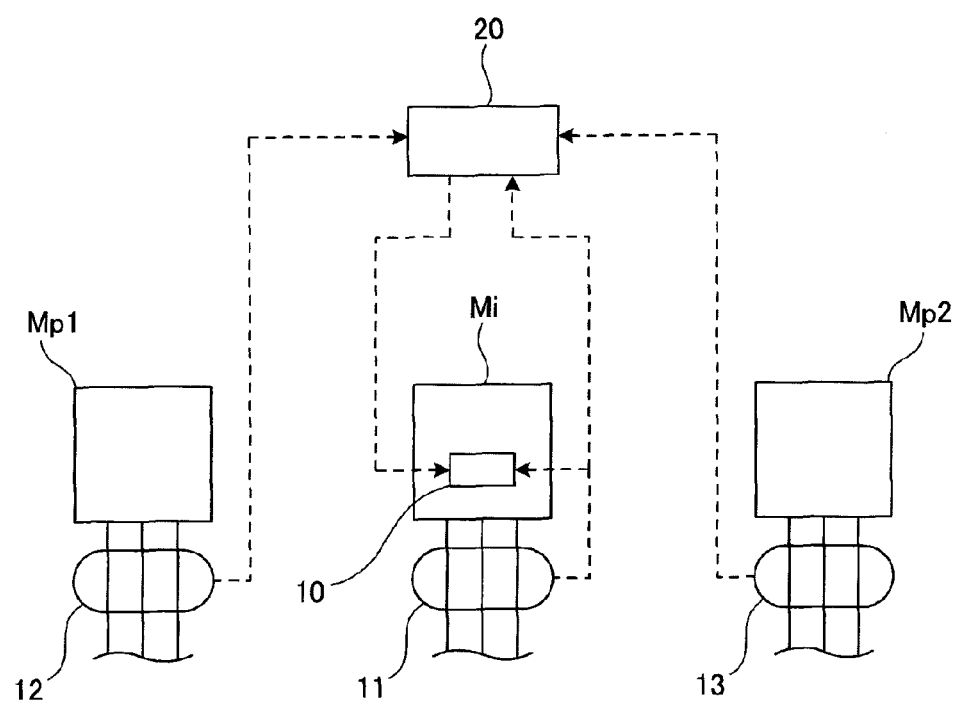

[FIG.2]
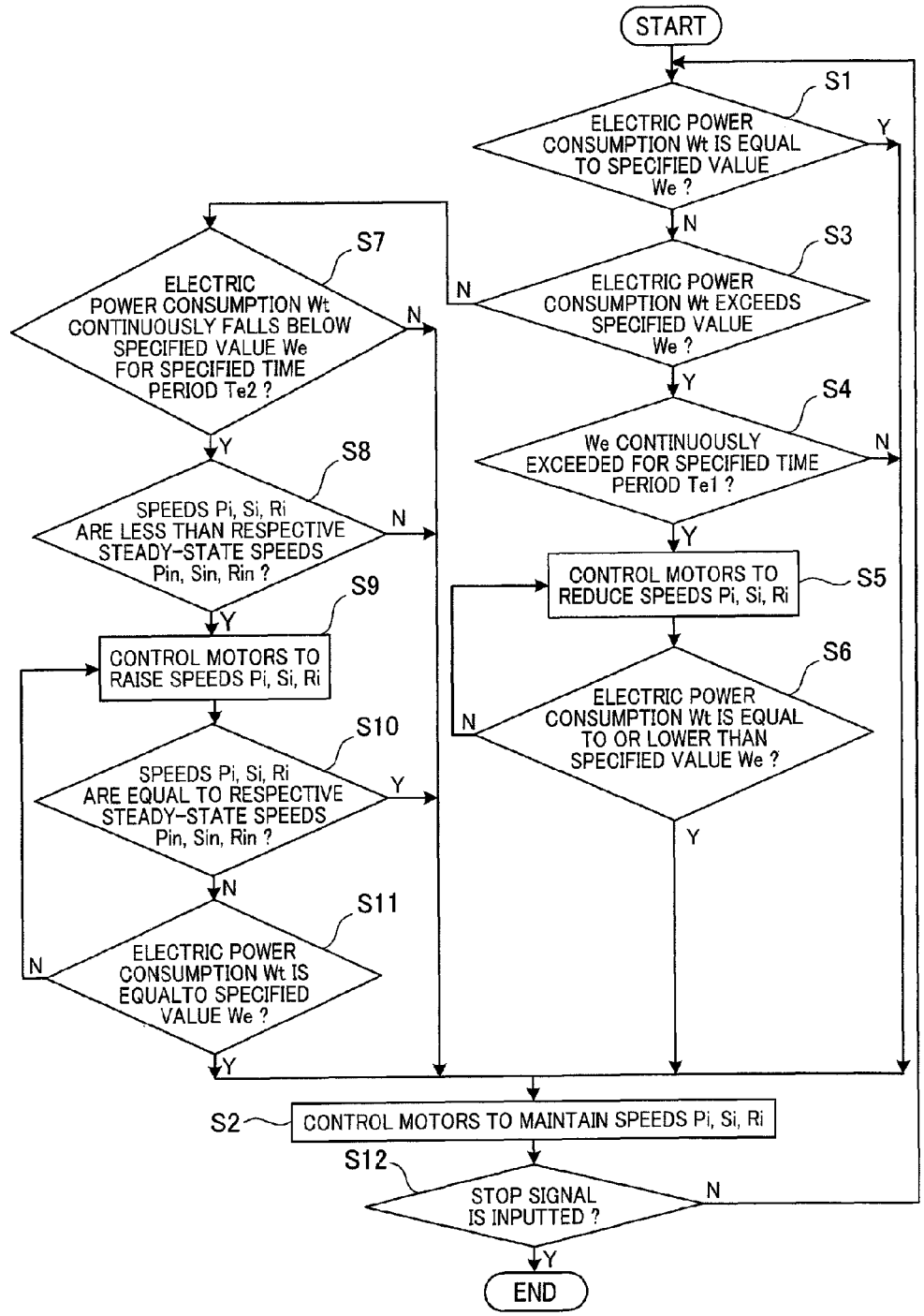

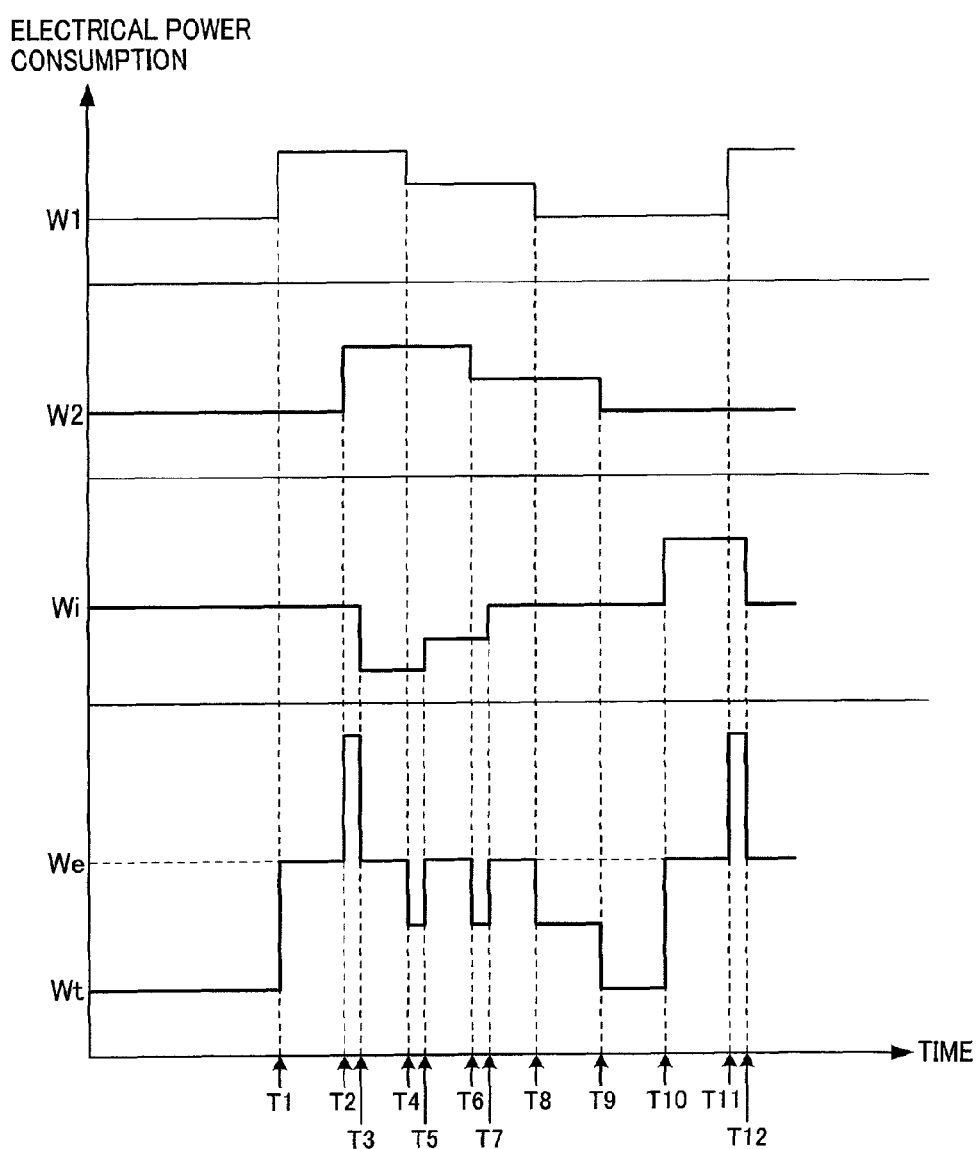
[FIG.3]

ELECTRIC POWER CONSUMPTION CONTROL SYSTEM

TECHNICAL FIELD

The present invention relates to an electric power consumption control system for a facility in which multiple industrial machines each causing a motor to rotationally drive are installed. Particularly, the present invention is very effective when applied to a facility in which machine tools each configured to machine a workpiece by moving a tool and the workpiece relative to each other are installed.

BACKGROUND ART

A machine tool tends to consume a very large amount of electric power when a tool and a workpiece are moved relative to each other, i.e. when a positioning and feeding motion is performed, compared to other cases. Accordingly, in a facility such as a factory in which multiple machine tools are installed, a large peak occurs in an electric power consumption of the facility when the timings of positioning and feeding motion of these machine tools coincide with each other. As a result, a large load is placed on a power supply system of the facility.

In this respect, for example, Patent Document 1 listed below and the like proposes a processing machine including a mode changing switch allowing the processing machine to change from a normal mode to an energy saving mode and vice versa. An operator can set the mode changing switch to the energy saving mode as needed and thereby reduce the required current to deal with the large peak.

CITATION LIST

Patent Literature

Patent Document 1: Japanese Patent Application Publication No. Hei 6-161535

SUMMARY OF INVENTION

Technical Problem

In the processing machine described in Patent Document 1 and the like, the operator sets the mode changing switch to the energy saving mode as needed and thereby deals with the large peak. Accordingly, when a large peak occurs in the electric power consumption of the facility while the operator is performing a machining work, it is difficult for the operator to deal with the large peak.

Such a problem may occur not only in the aforementioned machine tool which machines a workpiece by moving a tool and the workpiece relative to each other, but also in an industrial machine which performs the positioning and feeding motion, such as a press machine, an extruder, and an industrial robot, and to any industrial machine which causes a motor to rotationally drive, such as a pump or a blower.

In view of this problem, an object of the present invention is to provide an electric power consumption control system capable of easily suppressing a load on a power supply system of a facility even when a large peak occurs in an electric power consumption of the facility while an operator is performing a work.

Solution to Problem

An electric power consumption control system according to a first aspect of the invention for solving the problem is an electric power consumption control system for a facility in which a plurality of industrial machines each causing a motor to rotationally drive are installed, the electric power consumption control system characterized in that only one of the industrial machines includes controlling means for controlling at least one of a rotational acceleration/deceleration speed $P_i$ and a rotational speed $S_i$ of the motor of the one industrial machine, on the basis of information on an electric power consumption $W_t$ of the facility, in such a way that the electric power consumption $W_t$ becomes equal to or less than a specified value $W_e$, and the electric power consumption control system comprises electric power monitoring means for obtaining the electric power consumption $W_t$ of the facility by measuring each of electric power consumptions of all of the industrial machines installed in the facility and for providing the information on the electric power consumption $W_t$ to the controlling means of the industrial machine including the controlling means.

An electric power consumption control system according to a second aspect of the invention is the electric power consumption control system according to the first aspect of the invention characterized in that the controlling means of the industrial machine including the controlling means controls the motor of the industrial machine including the controlling means on the basis of information indicating that the electric power consumption $W_t$ continuously exceeds the specified value $W_e$ for a specified time period $T_{e1}$, in such a way that at least one of the rotational acceleration/deceleration speed $P_i$ and the rotational speed $S_i$ of the industrial machine including the controlling means is reduced until the electric power consumption $W_t$ becomes equal to or less than the specified value $W_e$.

An electric power consumption control system according to a third aspect of the invention is the electric power consumption control system according to the first aspect of the invention or the second aspect of the invention characterized in that, when at least one of the rotational acceleration/deceleration speed $P_i$ and the rotational speed $S_i$ of the industrial machine including the controlling means is less than a steady state value $P_{in}$, $S_{in}$, the controlling means of the industrial machine including the controlling means controls the motor of the industrial machine including the controlling means, on the basis of information indicating that the electric power consumption $W_t$ continuously falls below the specified value $W_e$ for a specified time period $T_{e2}$, in such a way that the at least one of the rotational acceleration/deceleration speed $P_i$ and the rotational speed $S_i$ is raised until any one of following conditions is satisfied: the at least one of the rotational acceleration/deceleration speed $P_i$ and the rotational speed $S_i$ reaches the steady state value $P_{in}$, $S_{in}$; and the electric power consumption $W_t$ reaches the specified value $W_e$.

An electric power consumption control system according to a fourth aspect of the invention is the electric power consumption control system according to any one of the first aspect of the invention to the third aspect of the invention characterized in that the industrial machine including the controlling means is a machine tool for machining a workpiece by moving a tool and the workpiece relative to each other, the rotational acceleration/deceleration speed $P_i$ is an acceleration/deceleration speed $P_i$ of a positioning and feeding motion, and the rotational speed $S_i$ is a feeding speed $S_i$ of the positioning and feeding motion.

An electric power consumption control system according to a fifth aspect of the invention is the electric power consumption control system according to the fourth aspect of the invention characterized in that the controlling means of the machine tool including the controlling means further controls an acceleration/deceleration speed Ri of a rotating motion of a main spindle of the machine tool on the basis of the information on the electric power consumption Wt in such a way that the electric power consumption Wt becomes equal to or less than the specified value We.

An electric power consumption control system according to a sixth aspect of the invention is the electric power consumption control system according to the fifth aspect of the invention characterized in that the controlling means of the machine tool including the controlling means further controls the motor of the machine tool including the controlling means on the basis of information indicating that the electric power consumption Wt continuously exceeds the specified value We for the specified time period Te1, in such a way that the acceleration/deceleration speed Ri of the machine tool including the controlling means is reduced until the electric power consumption Wt becomes equal to or less than the specified value We.

An electric power consumption control system according to a seventh aspect of the invention is the electric power consumption control system according to the fifth aspect of the invention or the sixth aspect of the invention characterized in that, when the acceleration/deceleration speed Ri of the machine tool including the controlling means is less than a steady state value Rin, the controlling means of the machine tool including the controlling means controls the motor of the machine tool including the controlling means on the basis of information indicating that the electric power consumption Wt continuously falls below the specified value We for the specified time period Te2, in such a way that the acceleration/deceleration speed Ri is raised until any one of following conditions is satisfied: the acceleration/deceleration speed Ri reaches the steady state value Rin; and the electric power consumption Wt reaches the specified value We.

An electric power consumption control system according to an eighth aspect of the invention is the electric power consumption control system according to any one of the first aspect of the invention to the seventh aspect of the invention characterized in that the controlling means of the industrial machine including the controlling means controls the industrial machine in such a way that an average value of the electric power consumption Wt during a specified time period becomes equal to or less than the specified value We.

Advantageous Effects of Invention

In the electric power consumption control system of the present invention, the controlling means controls at least one of the rotational acceleration/deceleration speed Pi and the rotational speed Si of the motor of the industrial machine on the basis of the information on the electric power consumption Wt of the facility, in such a way that the electric power consumption Wt becomes equal to or less than the specified value We. Thus, even when a large peak occurs in the electric power consumption Wt of the facility while an operator is performing a work, a load on a power supply system of the facility can be suppressed easily.

BRIEF DESCRIPTION OF DRAWINGS

FIG. 1 is an overall configuration diagram showing a main portion in a main embodiment of an electric power consumption control system of the present invention.

FIG. 2 is a control flowchart of the main embodiment of the electric power consumption control system of the present invention.

FIG. 3 is a time chart of electric power consumption in the main embodiment of the electric power consumption control system of the present invention.

DESCRIPTION OF EMBODIMENTS

Embodiments of an electric power consumption control system of the present invention are described below based on the drawings. However, the present invention is not limited to the embodiments described below based on the drawings.

Main Embodiment

A main embodiment of the electric power consumption control system of the present invention is described based on FIGS. 1 to 3.

In FIG. 1, machine tools Mp1, Mp2 are each a general machine tool such as a general-purpose machine center which is installed in a facility such as a factory and which machines a workpiece by moving a tool and the workpiece relative to each other, the general machine tool performing a rotating motion of a main spindle and a positioning and feeding motion by causing motors to rotationally drive. Moreover, as similar to the machine tools Mp1, Mp2, a machine tool Mi of the present invention is also a general machine tool such as a general-purpose machine center which is installed in the facility and which machines a workpiece by moving a tool and the workpiece relative to each other, the general machine tool performing the rotating motion of a main spindle and the positioning and feeding motion by causing a motor to rotationally drive. However, the machine tool Mi is different from the machine tools Mp1, Mp2 in that the machine tool Mi includes a control device being controlling means having technical characteristics to be described later.

The machine tools Mi, Mp1, Mp2 are respectively provided with electric power detection instruments 11 to 13 which measure electric power consumption. The electric power detection instruments 11 to 13 are connected to an input portion of an electric power monitoring instrument 20 which obtains electric power consumption Wt of the entire facility. An output portion of the electric power monitoring instrument 20 and the electric power detection instrument 11 are connected to an input portion of the control device 10 of the machine tool Mi. The control device 10 is configured to be capable of controlling an acceleration/deceleration speed (rotational acceleration/deceleration speed of a servo motor for the positioning and feeding motion) Pi and a feeding speed (rotational speed of the servo motor for the positioning and feeding motion) Si of the positioning and feeding motion of the machine tool Mi and an acceleration/deceleration speed (rotational acceleration/deceleration speed of a motor for the rotating motion of the main spindle) Ri of the rotating motion of the main spindle, on the basis of information provided from the electric power monitoring instrument 20 and the electric power detection instrument 11, in such a way that the electric power consumption Wt of the facility becomes equal to or less than a specified value We (to be described specifically later).

In the embodiment, electric power monitoring means is formed of the electric power detection instruments 11 to 13, the electric power monitoring instrument 20, and the like.

Operations of the machine tool Mi of the embodiment as described above and the electric power consumption control system using the machine tool Mi are described based on FIGS. 2, 3.

When the machine tools Mp1, Mp2 are actuated and the machine tool Mi is also actuated to machine (for example, mill) a workpiece (for example, aluminum), the electric power monitoring instrument 20 obtains the total of electric power consumption Wi (for example, 20 kW), electric power consumption W1 (for example, 10 kW), and the electric power consumption W2 (for example, 10 kW) respectively of the machine tools Mi, Mp1, Mp2, i.e. the electric power consumption Wt (for example, 40 kW) of the facility on the basis of the information from the electric power detection instruments 11 to 13, and monitors whether the electric power consumption Wt is equal to or less than the specified value We (for example, 50 kW).

When the electric power consumption Wt of the facility is judged to be the specified value We (S1 in FIG. 2), in the machine tool Mi, the control device 10 controls the servo motor for the positioning and feeding motion and the motor for the rotating motion of the main spindle on the basis of the information from the electric power monitoring instrument 20 and the electric power detection instrument 11, in such a way that the acceleration/deceleration speed Pi and the feeding speed Si of the positioning and feeding motion and the acceleration/deceleration speed Ri of the rotating motion of the main spindle are maintained, i.e. machining is performed at steady-state values Pin, Sin, Rin of the respective speeds (S2 in FIG. 2).

Here, for example, assume a case where a machining load on the machine tool Mp1 increases and the electric power consumption W1 of the machine tool Mp1 increases (for example, 20 kW), thereby causing the electric power consumption Wt of the facility to increase (for example, 50 kW) (T1 in FIG. 3). Even in this case, if the electric power consumption Wt is equal to or less than the specified value We, in the machine tool Mi, the control device 10 continues to control the motors on the basis of the information from the electric power monitoring instrument 20 and the electric power detection instrument 11, in such a way that the machining is performed at the steady-state speeds Pin, Sin, Rin (S2 in FIG. 2).

Moreover, assume a case, for example, where a machining load on the machine tool Mp2 increases and the electric power consumption W2 of the machine tool Mp2 increases (for example, 20 kW), thereby causing the electric power consumption Wt of the facility to further increase (for example, 60 kW) and exceed the specified value We (S3 in FIG. 2/T2 in FIG. 3). In this case, in the machine tool Mi, the control device 10 checks whether the electric power consumption Wt continuously exceeds the specified value We for a specified time period Te1 (for example, one minute) on the basis of the information from the electric power monitoring instrument 20 and the electric power detection instrument 11 (S4 in FIG. 2). When the electric power consumption Wt continuously exceeds the specified value We only for a time less than the specified time period Te1, the control device 10 continues to control the motors in such a way that the machining is performed at the steady-state speeds Pin, Sin, Rin (S2 in FIG. 2).

Meanwhile, when the electric power consumption Wt continuously exceeds the specified value We for the specified time period Te1, in the machine tool Mi, the control device 10 controls the motors on the basis of the information from the electric power monitoring instrument 20 and the electric power detection instrument 11, in such a way that the speeds Pi, Si, Ri are reduced until the electric power consumption Wt of the facility becomes equal to or less than the specified value We (T3 in FIG. 3). The machining continues in this state (S5, S6 in FIG. 2).

For example, the feeding speed is proportionate to a required driving force Pc, as could be understood from the following formula, and the required driving force Pc can be reduced by reducing the feeding speed, i.e. the electric power consumption Wi can be decreased by reducing the feeding speed.

$$Pc = ap \cdot ae \cdot Vf \cdot Kc/60 * 10^6 * \eta$$

In this formula, ap represents a depth of cut (mm), ae represents a width of cut (mm), Vf represents the feeding speed (mm/minute), Kc represents a specific cutting resistance (MPa), η represents a mechanical efficiency, and Pc represents the required driving force (kW).

The machine tools Mp1 (for example, 20 kW), Mp2 (for example, 20 kW), Mi (for example, 10 kW) can thus continuously machine the workpiece with the electric power consumption Wt (for example, 50 kW) of the facility being equal to or less than the specified value We (for example, 50 kW).

Moreover, for example, assume a case where a machining load on the machine tool Mp1 decreases and the electric power consumption W1 of the machine tool Mp1 decreases (for example, 15 kW), thereby causing the electric power consumption Wt of the facility to decrease (for example, 45 kW) and falls below the specified value We (S3 in FIG. 2/T4 in FIG. 3). In this case, in the machine tool Mi, the control device 10 checks whether the electric power consumption Wt continuously falls below the specified value We for a specified time period Te2 (for example, one minute) on the basis of the information from the electric power monitoring instrument 20 and the electric power detection instrument 11 (S7 in FIG. 2). When the electric power consumption Wt continuously falls below the specified value We only for a time less than the specified time period Te2, the control device 10 controls the motors in such a way that the machining is continuously performed in the state with the speeds Pin, Sin, Rin (S2 in FIG. 2).

Meanwhile, when the electric power consumption Wt continuously falls below the specified value We for the specified time period Te2, in the machine tool Mi, the control device 10 further checks whether the speeds Pi, Si, Ri are respectively at the steady-state speeds Pin, Sin, Rin (S8 in FIG. 2). When the speeds Pi, Si, Ri are respectively at the steady-state speeds Pin, Sin, Rin, the control device 10 controls the motors in such a way that the machining continuous at the steady-state speeds Pin, Sin, Rin (S2 in FIG. 2).

Meanwhile, when the speeds Pi, Si, Ri are respectively less than the steady-state speeds Pin, Sin, Rin, in the machine tool Mi, the control device 10 controls the motors on the basis of the information from the electric power monitoring instrument 20 and the electric power detection instrument 11, in such a way that the speeds Pi, Si, Ri are raised until any one of the following conditions are satisfied: the speeds Pi, Si, Ri respectively reach the steady-state value Pin, Sin, Rin; and the electric power consumption Wt of the facility reaches the specified value We (in this case until the electric power consumption Wt reaches the specified value We) (S9 to S11 in FIG. 2/T5 in FIG. 3).

The machine tool Mi (for example, 15 kW), can thus improve the machining ability for the workpiece with the electric power consumption Wt (for example, 50 kW) of the facility being equal to the specified value We (for example, 50 kW).

Moreover, assume a case where, for example, the machining load on the machine tool Mp2 decreases and the electric power consumption W2 of the machine tool Mp2 decreases (for example, 15 kW), thereby causing the electric power consumption Wt of the facility to decrease (for example, 45 kW) and become equal to or less than the specified value We (T6 in FIG. 3). In this case, when the electric power consumption Wt is less than the specified value We for a specified time period Te2 (for example, one minute), in the machine tool Mi, the control device 10 continues to control the motors on the basis of the information from the electric power monitoring instrument 20 and the electric power detection instrument 11, in such a way that the speeds Pi, Si, Ri are raised until any one of the following conditions are satisfied: the speeds Pi, Si, Ri respectively reach the steady-state value Pin, Sin, Rin; and the electric power consumption Wt of the facility reaches the specified value We (in this case until the speeds Pi, Si, Ri respectively reach the steady-state value Pin, Sin, Rin and the electric power consumption Wt reaches the specified value We) (S10 in FIG. 2/T7 in FIG. 3).

The machine tool Mi (for example, 20 kW) can restore the machining ability for the workpiece with the electric power consumption Wt (for example, 50 kW) of the facility being equal to the specified value We (for example, 50 kW).

Moreover, assume a case where, for example, the machining load on the machine tool Mp1 also decreases, the electric power consumption W1 of the machine tool Mp1 decreases to an original level (for example, 10 kW), and the electric power consumption Wt of the facility decreases (for example, 45 kW), thereby causing the electric power consumption Wt to fall below the specified value We. Even when this state continues for the specified time period Te2 (T8 in FIG. 3), in the machine tool Mi, the control device 10 continues to maintain the control of the motors as it is, if the machine tool Mi is machining at the steady-state speeds Pin, Sin, Rin (S8 in FIG. 2), the control maintained on the basis of the information from the electric power monitoring instrument 20 and the electric power detection instrument 11, in such a way that the machining is performed at the steady-state speeds Pin, Sin, Rin (S2 in FIG. 2).

Similarly, assume a case where, for example, the machining load on the machine tool Mp2 further decreases as well, the electric power consumption W2 of the machine tool Mp2 decreases to an original level (for example, 10 kW), and the electric power consumption Wt of the facility further decreases (for example, 40 kW), thereby causing the electric power consumption Wt to fall below the specified value We. Even when this state continues for the specified time period Te2 (T9 in FIG. 3), in the machine tool Mi, the control device 10 continues to maintain the control of the motors as it is, if the machine tool Mi is machining at the steady-state speeds Pin, Sin, Rin (S8 in FIG. 2), the control maintained on the basis of the information from the electric power monitoring instrument 20 and the electric power detection instrument 11, in such a way that the machining is performed at the steady-state speeds Pin, Sin, Rin (S2 in FIG. 2).

Here, assume a case where, for example, the machining load on the machine tool Mi increases, the electric power consumption Wi of the machine tool Mi increases (for example, 30 kW), and the electric power consumption Wt of the facility increases (for example, 50 kW) (T10 in FIG. 3). Even in this case, when the electric power consumption Wt is equal to or lower than the specified value We, in the machine tool Mi, the control device 10 continues to control the motors on the basis of the information from the electric power monitoring instrument 20 and the electric power detection instrument 11 in such a way that the machining is performed at the steady-state speeds Pin, Sin, Rin (S2 in FIG. 2).

Moreover, assume a case where, for example, the machining load on the machine tool Mp1 again increases, the electric power consumption W1 of the machine tool Mp1 increases (for example, 20 kW), the electric power consumption Wt of the facility increases (for example, kW), and the electric power consumption Wt continuously exceeds the specified value We for the specified time period Te1 (T11 in FIG. 3). Here, as in the case described above, the control device 10 controls the motors on the basis of the information from the electric power monitoring instrument 20 and the electric power detection instrument 11, in such a way that the speeds Pi, Si, Ri are reduced until the electric power consumption Wt of the facility becomes equal to or less than the specified value We (T3 in FIG. 3). The machining continues in this state.

Hereafter, the machine tool Mi can continuously perform the machining of workpiece with the electric power consumption Wt of the facility being equal to or less than the specified value We, by repeating the operation described above until a stop signal is inputted (S12 in FIG. 2) and the operation is thereby terminated.

Accordingly, in the embodiment, a load on a power supply system of the facility can be easily suppressed even when a large peak occurs in the electric power consumption Wt of the facility while an operator is performing a machining work.

Moreover, an average value of the electric power consumption Wt (demanded electric power) in a predetermined time period (for example, 30 minutes) can be made equal to or less than the specified value We. This makes it possible to reduce a basic charge for the facility in a contract with an electric company and thereby reduce the operating cost of the entire facility, for example.

Other Embodiments

In the embodiment described above, the descriptions are given of the case where the control device 10 of the machine tool Mi controls the acceleration/deceleration speed Pi and the feeding speed Si of the positioning and feeding motion and the acceleration/deceleration speed Ri of the rotating motion of the main spindle, on the basis of the information from the electric power monitoring instrument 20 and the electric power detection instrument 11. However, depending on machining work conditions and the like, the control device 10 of the machine tool Mi may omit the control of the acceleration/deceleration speed Ri of the rotating motion of the main spindle and control only the acceleration/deceleration speed Pi and the feeding speed Si of the positioning and feeding motion or control only one of the acceleration/deceleration speed Pi and the feeding speed Si of the positioning and feeding motion, on the basis of the information from the electric power monitoring instrument 20 and the electric power detection instrument 11. Operation and effect similar to those of the embodiment described above can be also obtained by performing the controls described above.

In the embodiment described above, the descriptions are given of the case where the present invention is applied to the machine tools Mi, Mp1, and Mp2 which each machine the workpiece by moving the tool and the workpiece relative to each other. However, the present invention can be applied to an industrial machine which performs the positioning and feeding motion, such as a press machine, an extruder, and an industrial robot, and to any industrial machine which causes a motor to rotationally drive, such as a pump or a blower. The present invention can be applied to such industrial machines in a similar manner as the embodiment described above and similar operation and effects can be obtained by controlling at least one of the rotational acceleration/deceleration speed Pi and the rotational speed Si.

INDUSTRIAL APPLICABILITY

The electric power consumption control system of the present invention can easily suppress the load on the power supply system of the facility even when a large peak occurs in

REFERENCE SIGNS LIST

Mi, Mp1, Mp2 machine tool
10 control device
11 to 13 electric power detection instrument
20 electric power monitoring instrument
Wi electric power consumption of machine tool Mi
W1 electric power consumption of machine tool Mp1
W2 electric power consumption of machine tool Mp2
Wt electric power consumption of entire facility
We specified value

The invention claimed is:

1. An electric power consumption control system for a facility in which a plurality of industrial machines each causing a motor to rotationally drive are installed, wherein
only one of the industrial machines includes controlling means for controlling at least one of a rotational acceleration/deceleration speed Pi and a rotational speed Si of the motor of the one industrial machine, on the basis of information on an electric power consumption Wt of the facility, in such a way that the electric power consumption Wt becomes equal to or less than a specified value We, and
the electric power consumption control system comprises electric power monitoring means for obtaining the electric power consumption Wt of the facility by measuring each of electric power consumptions of all of the industrial machines installed in the facility and for providing the information on the electric power consumption Wt to the controlling means of the industrial machine including the controlling means.

2. The electric power consumption control system according to claim 1, wherein, when at least one of the rotational acceleration/deceleration speed Pi and the rotational speed Si of the industrial machine including the controlling means is less than a steady state value Pin, Sin, the controlling means of the industrial machine including the controlling means controls the motor of the industrial machine including the controlling means, on the basis of information indicating that the electric power consumption Wt continuously falls below the specified value We for a specified time period Te2, in such a way that the at least one of the rotational acceleration/deceleration speed Pi and the rotational speed Si is raised until any one of following conditions is satisfied: the at least one of the rotational acceleration/deceleration speed Pi and the rotational speed Si reaches the steady state value Pin, Sin; and the electric power consumption Wt reaches the specified value We.

3. The electric power consumption control system according to claim 1, wherein
the industrial machine including the controlling means is a machine tool for machining a workpiece by moving a tool and the workpiece relative to each other,
the rotational acceleration/deceleration speed Pi is an acceleration/deceleration speed Pi of a positioning and feeding motion, and
the rotational speed Si is a feeding speed Si of the positioning and feeding motion.

4. The electric power consumption control system according to claim 3, wherein the controlling means of the machine tool including the controlling means further controls an acceleration/deceleration speed Ri of a rotating motion of a main spindle of the machine tool on the basis of the information on the electric power consumption Wt in such a way that the electric power consumption Wt becomes equal to or less than the specified value We.

5. The electric power consumption control system according to claim 4, wherein the controlling means of the machine tool including the controlling means further controls the motor of the machine tool including the controlling means on the basis of information indicating that the electric power consumption Wt continuously exceeds the specified value We for the specified time period Te1, in such a way that the acceleration/deceleration speed Ri of the machine tool including the controlling means is reduced until the electric power consumption Wt becomes equal to or less than the specified value We.

6. The electric power consumption control system according to claim 4, wherein, when the acceleration/deceleration speed Ri of the machine tool including the controlling means is less than a steady state value Rin, the controlling means of the machine tool including the controlling means controls the motor of the machine tool including the controlling means on the basis of information indicating that the electric power consumption Wt continuously falls below the specified value We for the specified time period Te2, in such a way that the acceleration/deceleration speed Ri is raised until any one of following conditions is satisfied: the acceleration/deceleration speed Ri reaches the steady state value Rin; and the electric power consumption Wt reaches the specified value We.

7. The electric power consumption control system according to claim 1, wherein the controlling means of the industrial machine including the controlling means controls the industrial machine in such a way that an average value of the electric power consumption Wt during a specified time period becomes equal to or less than the specified value We.

8. The electric power consumption control system according to claim 1, wherein the controlling means of the industrial machine including the controlling means controls the motor of the industrial machine including the controlling means on the basis of information indicating that the electric power consumption Wt continuously exceeds the specified value We for a specified time period Te1, in such a way that at least one of the rotational acceleration/deceleration speed Pi and the rotational speed Si of the industrial machine including the controlling means is reduced until the electric power consumption Wt becomes equal to or less than the specified value We.

* * * * *